US010345440B1

(12) United States Patent
West et al.

(10) Patent No.: US 10,345,440 B1
(45) Date of Patent: Jul. 9, 2019

(54) REDUCED-BIAS MULTI-RESOLUTION COHERENT CHANGE DETECTION

(71) Applicant: National Technology & Engineering Solutions of Sandia, LLC, Albuquerque, NM (US)

(72) Inventors: Roger Derek West, Albuquerque, NM (US); Mary M. Moya, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 771 days.

(21) Appl. No.: 14/957,393

(22) Filed: Dec. 2, 2015

(51) Int. Cl.
*G01S 13/90* (2006.01)

(52) U.S. Cl.
CPC .................... *G01S 13/90* (2013.01)

(58) Field of Classification Search
CPC ............................ G01S 13/90–9094
See application file for complete search history.

(56) References Cited

U.S. PATENT DOCUMENTS

| | | | | |
|---|---|---|---|---|
| 6,097,328 A * | 8/2000 | Frankot | ................... | G01S 7/295 342/25 C |
| 6,622,118 B1 * | 9/2003 | Crooks | ................... | G01S 7/292 342/173 |
| 9,395,437 B2 * | 7/2016 | Ton | ....................... | G01S 13/885 |
| 9,880,277 B2 * | 1/2018 | Knight | ................ | G01S 13/9035 |
| 2012/0328161 A1 * | 12/2012 | Palenychka | ........ | G06K 9/00744 382/107 |

OTHER PUBLICATIONS

Abubakr et al. "Revisiting Methods and Potentials of SAR Change Detection," Proceedings of the World Congress on Engineering 2013 vol. III, Jul. 3-5, 2013, London, U.K. (Year: 2013).*
T. T. Lê, A. M. Atto, E. Trouvé and J. Nicolas, "Adaptive Multitemporal SAR Image Filtering Based on the Change Detection Matrix," in IEEE Geoscience and Remote Sensing Letters, vol. 11, No. 10, pp. 1826-1830, Oct. 2014.doi: 10.1109/LGRS.2014.2311663 (Year: 2014).*
K. Ranney and M. Soumekh, "Adaptive change detection in coherent and noncoherent SAR imagery," IEEE International Radar Conference, 2005., Arlington, VA, 2005, pp. 195-200.doi: 10.1109/RADAR.2005.1435818 (Year: 2005).*

(Continued)

*Primary Examiner* — Matthew M Barker
(74) *Attorney, Agent, or Firm* — Medley, Behrens & Lewis, LLC

(57) ABSTRACT

Described herein are various technologies relating to generating a reduced bias multi-resolution (RBMR) coherent change detection (CCD) image product. A low bias, low resolution (LBLR) CCD image product is generated based upon a first SAR image of a scene and a second SAR image of the scene, where each pixel in the LBLR CCD image has a respective value that is computed using a large box-filter. The LBLR CCD image is segmented into a plurality of segments, and a box-filter size is determined for each segment based upon values of pixels in the segment. A RBMR CCD image product is then computed using box-filters of the determined sizes.

10 Claims, 14 Drawing Sheets

(56) References Cited

OTHER PUBLICATIONS

O. Yousif and Y. Ban, "Improving Urban Change Detection From Multitemporal SAR Images Using PCA-NLM," in IEEE Transactions on Geoscience and Remote Sensing, vol. 51, No. 4, pp. 2032-2041, Apr. 2013.doi: 10.1109/TGRS.2013.2245900 (Year: 2013).*
Touzi, et al., "Coherence Estimation for SAR Imagery," Retrieved at <<http://wmsmir.cits.rncan.gc.ca/index.html/pub/geott/ess_pubs/219/219098/3235.pdf>>, pp. 1-38, 1999.
Bouaraba, et al., "Improving CCD Performance by the use of Local Fringe Frequencies," Progress in Electromagnetics Research C, vol. 32, pp. 123-137, 2012.
Achanta, et al. "SLIC Superpixels"—Ecole Polytechnique Federale de Lausanne (EPFL) Technical Report 149300, Retrieved at <<http://infoscience.epfl.ch/record/149300/files/SLIC_Superpixels_TR_2.pdf>>, pp. 1-15, Jun. 2010.
Achanta, et al., "SLIC Superpixels Compared to State-of-the-art Superpixel Methods", IEEE Transactions on Pattern Analysis and Machine Intelligence, vol. 34, No. 11, pp. 2274-2281, Nov. 2012.

\* cited by examiner (a) Low-bias low-resolution CCD Image (L≈108)

(b) Traditional CCD Image (L≈9)

(c) Reduced-Bias Multi-Resolution CCD Image

REDUCED-BIAS MULTI-RESOLUTION COHERENT CHANGE DETECTION

STATEMENT OF GOVERNMENTAL INTEREST

This invention was developed under contract DE-AC04-94AL85000 between Sandia Corporation and the U.S. Department of Energy. The U.S. Government has certain rights in this invention.

BACKGROUND

Coherent change detection (CCD) image products can provide valuable information about subtle scene changes between two synthetic aperture radar (SAR) images of a scene captured at different acquisition times. CCD image products are formed from a pair of complex-valued SAR images by firstly performing a fine, sub-pixel registration of the two SAR images to form a stack of co-registered images, and secondly, computing the sample correlation of the product of the normalized first image with the complex-conjugate of the normalized second image. The resulting CCD image product illustrates variations in coherence.

Loss of coherence is often associated with subtle changes between the acquisition times of the two SAR images. In creating a CCD image product, a sample coherence statistic can be computed in local spatial regions with an M×N box-filter. The sample coherence statistic is a biased estimator for low coherence regions. Furthermore, an increase in a coherence-estimator filter width used to compute the sample coherence decreases a bias in the low coherence regions, and can also lower the resolution of the CCD image product. Hence, there is a tradeoff between allowable bias in low-coherence regions and the resolution of the entire CCD image product.

SUMMARY

The following is a brief summary of subject matter that is described in greater detail herein. This summary is not intended to be limiting as to the scope of the claims.

Various embodiments presented herein relate to mitigating effects engendered by bias in a CCD image product. Low coherence regions in a CCD image product ideally are of a single contrast, e.g., pixels in a low coherence region are each "dark". Owing to bias, however, the low coherence regions can have a "salt and pepper" contrast, wherein such contrast can be problematic for algorithms and other automated approaches to correctly resolve and/or identify features (e.g., natural objects, man-made objects, shadows, etc.) in a CCD image product.

In an embodiment, a low bias, low resolution (LBLR) CCD image product is formed based upon two SAR images utilizing a relatively large box-filter. The LBLR CCD image product can be generated to have a relatively small amount of bias therein, at the cost of having a relatively coarse resolution. The LBLR CCD image product can then be segmented into a plurality of segments through utilization of a suitable segmentation algorithm, where the purpose of segmentation is to (automatically) separate low coherence regions from high coherence regions in the LBLR CCD image product.

Each segment in the plurality of segments can subsequently be analyzed to estimate an amount of coherence corresponding to the segment. Based upon the estimated amount of coherence, a size of a box-filter to utilize to compute values for pixels in that segment can be ascertained, where for low coherence regions a relatively large-sized box-filter is desirable, while for high coherence regions a relatively small-sized box-filter is desirable. Accordingly, each pixel in the LBLR CCD image product has a size of a box-filter computed therefor, wherein such size is based upon the segment of the LBLR CCD image product that comprises the pixel and values of other pixels in such segment.

A reduced bias, multi-resolution (RBMR) CCD image product is then computed using the box-filter sizes identified in the manner described above. Accordingly, in the RBMR CCD image product, for pixels in regions of low coherence a larger-sized box filter is used to compute the value for such pixels (thereby reducing bias), while for pixels in regions of high coherence a smaller-sized box filter is used to compute the values for such pixels (thereby preserving details in high-coherence regions).

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
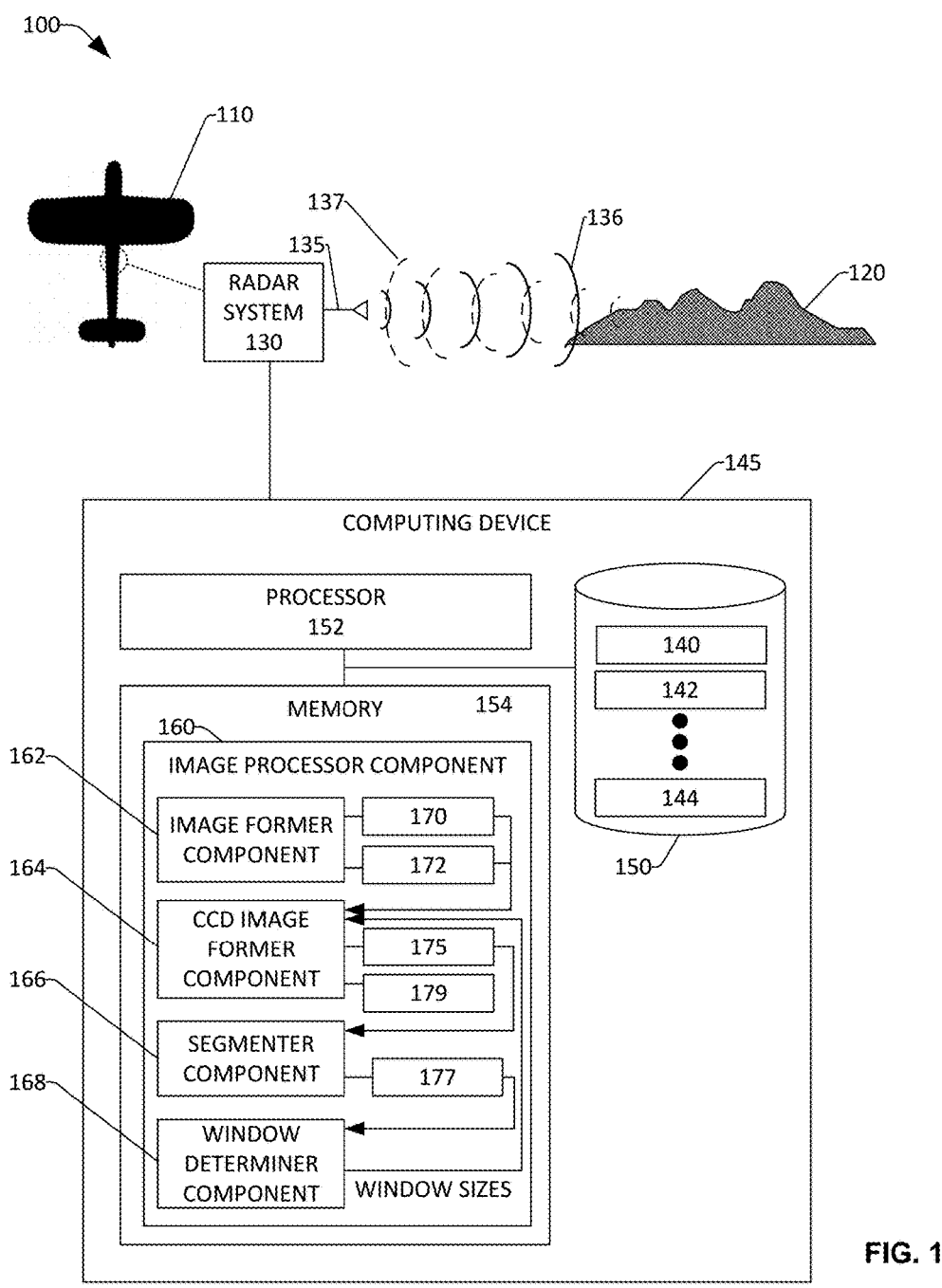
FIG. 1 illustrates an exemplary system for generating a reduced bias multi-resolution (RBMR CCD) image product.

Various technologies pertaining to forming coherent change detection (CCD) image products having locally adjusted resolution based on local coherence statistics of a preliminary coarse-resolution (low-bias) CCD image product are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. The terms "component" and "system" are also intended to encompass hardware configured to cause certain functionality to be performed, where such hardware can include, but is not limited to including, Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Further, the term "or" is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something, and is not intended to indicate a preference.

Various embodiments presented herein relate to forming CCD image products with locally adjusted image resolution, where resolution for a region is based on the local coherence statistics of a preliminary coarse-resolution (low-bias) CCD image product. The resulting image product is a reduced bias, multi-resolution (RBMR) CCD image with decreased bias in low coherence regions.

FIG. 1 illustrates a system 100 which can be utilized to generate RBMR CCD image products. FIG. 1 depicts an aircraft 110 navigating a scene 120, e.g., the aircraft 110 is flying in accordance with a known flight path having a defined geometry relative to a reference point of the scene 120.

The aircraft 110 has located thereon a radar system 130 that comprises an antenna 135. The antenna 135 transmits radar signals 136 (pulses, chirps, etc.) and receives radar echoes 137, which have been generated by reflection of the radar signals 136 from the scene 120. Transmission of the signals 136 can be performed in conjunction with a controller (not shown) incorporated into the radar system 130, wherein the controller can be or include a digital signal processor or other suitable circuit.

For each pass of the aircraft 110 over the scene 120, the radar system 130 can generate a respective set of data. For example, the radar system 130 generates a first set of data 140 for a first pass over the scene 120, the radar system 130 generates a second set of data 142 for a second pass over the scene 120, the radar system 130 generates an $n^{th}$ set of data 144 for an $n^{th}$ pass over the scene, etc., where n is a positive integer. In an example, the passes over the scene 120 can be conducted with relatively similar geometry relative to the scene 120. The sets of data 140, 142, and 144 can be in any suitable format, such as Ground-Based SAR Application Testbed File Format (GFF).

The system 100 further comprises a computing device 145 that is in direct or indirect communication with the radar system 130. For example, the computing device 145 can be co-located with the radar system 130 on the aircraft 110. In another example, the computing device 145 can be located at a ground station and can be in network communication with the radar system 130. In yet another example, the computing device 145 can be in indirect communication with the radar system 130. In such a case, the radar system 130 can be computer-readable storage co-located therewith for retaining the sets of data 140-144, and such data can be transferred to the computing device 145 through any suitable communications medium (e.g., wired or wirelined). Moreover, the computing device 145 can be distributed in nature, wherein some functionality described as being performed by the computing device 145 may occur on the aircraft 110, while other functionality may occur at a base station or processing facility.

The computing device 145 comprises a data store 150 which can retain the sets of data 140, 142, 144. The computing device 145 additionally includes a processor 152 and memory 154, where the memory 154 comprises components that are executed by the processor 152. While the memory 154 is shown as including several components, it is to be understood that FIG. 1 illustrates an exemplary embodiment. In other embodiments, rather than being implemented in memory, the components can be integrated circuits that are configured to perform specified functionality.

In the exemplary system 100 shown in FIG. 1, the memory 154 comprises an image processor component 160 that is configured to generate SAR images based upon data generated by the radar system 130. With more particularity, the image processor component 160 comprises an image former component 162 that can generate a first SAR image 170 based upon the first set of data 140 and a second SAR image 172 based upon the second set of data 142. Accordingly, the first SAR image 170 depicts the scene 120 for the first pass over the scene 120, and the second SAR image 172 depicts the scene 120 for the second pass over the scene 120.

The image processor component 160 further comprises a CCD image former component 164 that is configured to generate a complex CCD image product 175 based upon the first SAR image 170 and the second SAR image 172. Generally, the CCD image former component 164 generates the complex CCD image product 175 by: 1) performing a fine, sub-pixel registration of the first SAR image 170 and the second SAR image 172; and 2) computing the sample correlation of the product of the normalized first SAR image 170 with the complex-conjugate of the normalized second SAR image 172. When computing the aforementioned sample correlation to generate the complex CCD image product 175, the CCD image former component 164 can utilize a relatively large box-filter size (e.g., 25×25 pixels). That is, each pixel in the resultant complex CCD image product 175 has a value that is based upon values in a window of the box-filter size in the registered images, where the pixel is at the center of the box-filter. As the size of the box-filter increases, an amount of "blurring" in the complex CCD image product 175 likewise increases.

With more detail pertaining to CCD image products, such products are configured to illustrate variations in coherence of a scene (e.g., scene 120), where loss of coherence is often associated with subtle changes in the scene between acquisition times of data sets upon which a CCD image product is based. For example, a roof of a building in the scene can have minimal change (if any) between two passes over the scene, and therefore may be depicted in a complex CCD image product with a high level of coherency (e.g., a bright region). In another example, the surface of a dirt track in the scene can undergo disturbance as a result of a vehicle driving along the track between the two passes over the scene, and accordingly, the CCD image product can depict the dirt track as a region of low-coherency (e.g., as a dark region). In a further example, shadowed regions in the scene ideally should be represented in a complex CCD image product as dark regions; however, bias can exist in the complex CCD image product, wherein the bias is exhibited as a "salt and pepper" visual contrast. Automated processing of a complex CCD image product that includes bias can be problematic (e.g., to automatically label a structure, identify a material, etc.), as the bias may negatively impact operation of such processing.

As noted above, the CCD image former component 164 can generate the complex CCD image product 175 using a large-sized box-filter, such that the complex CCD image product 175 exhibits a relatively small amount of bias. The complex CCD image product 175, however, may not be particularly well-suited for direct provision to a classification system, as due to the use of the large-sized box-filter window when generating the CCD image product 175, details in high coherent regions maybe lost. In an example, the size of the box-filter utilized by the CCD image former component 164 when forming the CCD image product 175 can be set by an analyst.

As can be ascertained, the CCD image product 175 has a plurality of pixels that have respective values assigned thereto (which correspond to values of spatially corresponding pixels of the registered SAR image products 170-172). The image processor component 160 further comprises a segmenter component 166 that can be configured to receive the CCD image product 175 and segment the CCD image product 175 into a plurality of segments (superpixels) utilizing any suitable segmentation approach. The segmenter component 166 segments the CCD image product 175 based upon values of the pixels of the CCD image product 175. In a non-limiting example, the segmentation approach can be simple linear iterative clustering (SLIC). Generally, the purpose of the segmentation is to form clusters of pixels that are spatially proximate to one another and have similar values; accordingly, the segmentation results in a region of high coherence in the CCD image product 175 being in a separate segment from a region of low coherence in the CCD image product 175. Responsive to segmenting the CCD image product 175, the segmenter component 166 can output a segmented CCD image product 177.

The image processor component 160 further comprises a window determiner component 168 that determines sizes of box-filters for the CCD image former component 164 to utilize when generating a reduced bias multi-resolution (RBMR) CCD image product 179, wherein the window determiner component 168 determines the box-filter sizes based upon values of pixels in segments of the segmented CCD image product 177. Briefly, for pixels in a segment that represents a high coherency region of the scene 120, the window determiner component 168 can determine that a small-sized box filter window is to be used to compute values for such pixels. In contrast, for pixels in a segment that represents a low coherency region of the scene 120, the window determiner component 168 can determine that a large-sized box filter window is to be used to compute values for such pixels.

Additional detail regarding operation of the window determiner component 168 is now set forth. The window determiner component 168 receives the segmented CCD image product 177, and computes at least one value for each segment based upon values of pixels in each segment. With more particularity, the window determiner component 168, for a segment in the segmented CCD image product 177, receives values of pixels included in the segment. The window determiner component 168 can then compute at least one value (referred to as a coherence estimate value) based upon the values of the pixels included in the segment. The coherence estimate value can be or include, for example, a mean value of pixel values in the segment, an average value of pixel values in the segment, a median value of pixel values in the segment, a standard deviation of pixel values in the segment, a coefficient of variation for pixel values in the segment, etc. The coherence estimate value can be perceived as an estimate of an amount of coherence represented in the segment. The window determiner component 168 can repeat this task for each segment in the segmented CCD image product 177, such that each segment has a respective coherence estimate value assigned thereto (and thus each pixel has a coherence estimate value assigned thereto). Optionally, the window determiner component 168 can cluster segments based upon coherence estimate values assigned thereto, thereby forming annealed segments (annealed superpixels) that represent a fixed number of quantized coherence regions.

The window determiner component 168 can, for each segment (or annealed segment), select a size of a box-filter based upon the coherence estimate value for the segment (or annealed segment). For example, the memory 154 can optionally include a table (not shown) that maps coherence estimate values to sizes of box-filters. Thus, the table can map a first coherence estimate value to a first box-filter size, can map a second coherence estimate value to a second box-filter size, and so on. Using the table, then, the window determiner component 168 can determine a respective box-filter size for each pixel in the segmented CCD image product 177, and the CCD image former component 164 can subsequently use the box-filter sizes to generate the RBMR CCD image product 179.

In more detail, the CCD image former component 164 has previously registered the first SAR image 170 with the second SAR image 172. The CCD image former component 164 can, for each pixel in the RBMR CCD image product 179, compute the sample correlation of the product of the normalized first SAR image 170 with the complex-conjugate of the normalized second SAR image 172 using the box-filter size determined by the window determiner component 168. Hence, when computing a value for pixel (x, y) in the RBMR CCD image product 179, the CCD image former component 164 utilizes the box-filter size for pixel (x, y) determined by the window determiner component 168 for the segmented CCD image product 177. Therefore, the CCD image former component 164 generates the RBMR CCD image product 179 using different box-filter sizes for different pixels, with smaller box-filter sizes for regions of high coherency and larger box-filter sizes for regions of low coherency. As a result, in the RBMR CCD image product 179, details of regions estimated to be high coherency regions are maintained, while the "salt and pepper" corresponding to bias in low coherency regions is reduced or eliminated.

While not shown, subsequent to the CCD image former component 164 generating the RBMR CCD image product 179, such image product 179 can be presented on a display for review by an analyst. In another example, a computer program that is configured to identify and label features and/or structures in an image can be provided with the RBMR CCD image product 179, and can assign labels based upon values of pixels of the RBMR CCD image product 179.

Figure 2:
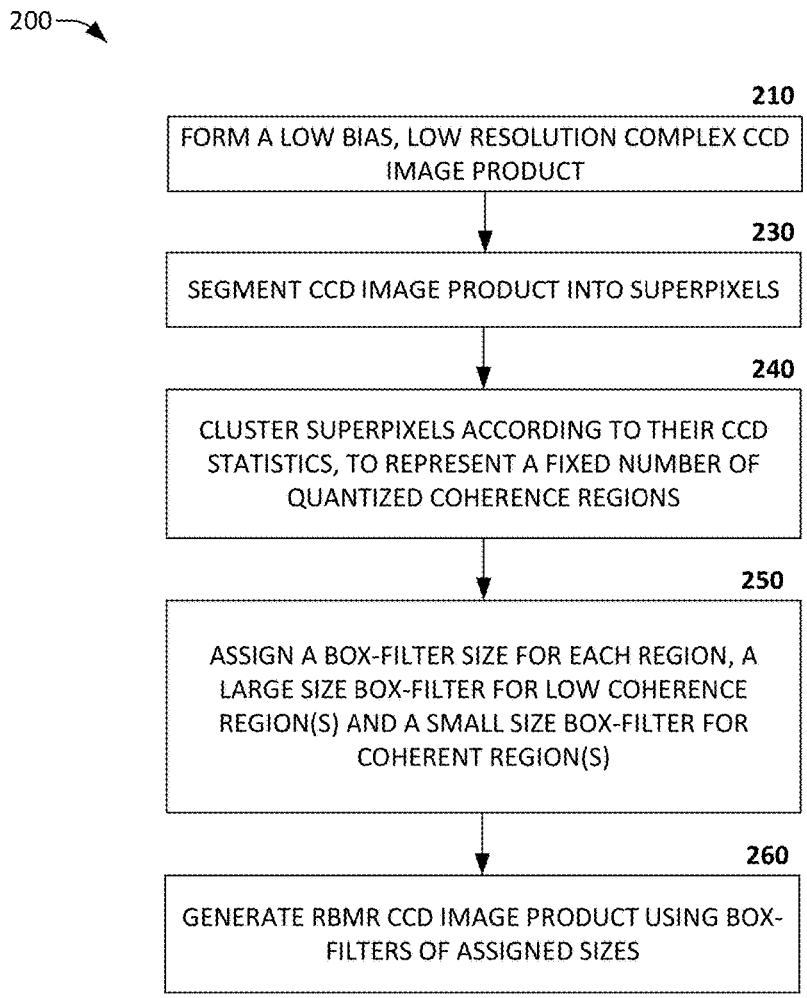
FIG. 2 is a flow diagram illustrating an exemplary methodology for generating a RBMR CCD image product.
Figure 13:
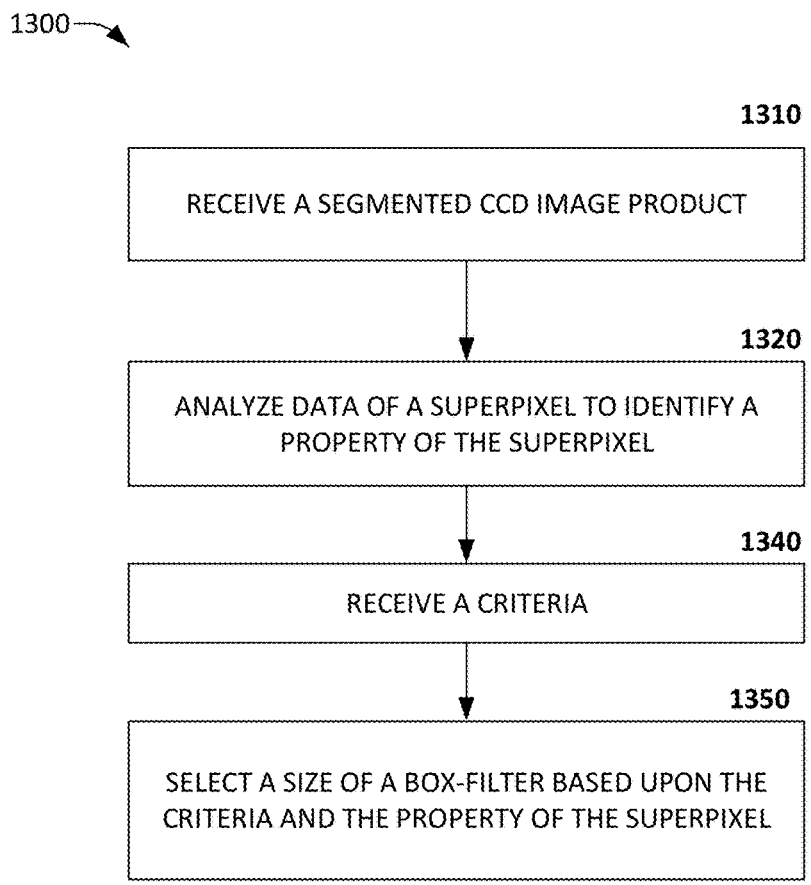
FIG. 13 is a flow diagram illustrating an exemplary methodology for processing an image based upon received criteria.

FIGS. 2 and 13 illustrate exemplary methodologies relating to forming a RBMR CCD image product. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement the methodologies described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 2 illustrates a methodology 200 relating to forming a RBMR image product, where the methodology can be executed by the image processor component 160. It is to be appreciated that methodology 200 provides a summary of various acts, with greater detail of various concepts, parameters, measurements, derivations, etc., pertaining to the various acts being provided further in this description. At 210, a low bias, low resolution (LBLR) complex CCD image product is formed based upon a first SAR image and a second SAR image. As noted above, to form the LBLR complex CCD image product, the first SAR image and the second SAR image are registered, and thereafter a sample correlation of the product of the normalized first SAR image with the complex-conjugate of the normalized second SAR image is computed. When forming the LBLR complex CCD image product, a relatively large box-filter can be used to compute values for each pixel in such CCD image product. The first SAR image is formed based upon first data generated by an on-board radar system during a first flyby by an aircraft over a scene, and the second SAR image is formed based upon second data generated by the on-board radar system during a second flyby of the aircraft over the scene. The first data and second data can respectively comprise SAR information, phase and magnitude information, flight information such as aircraft elevation, aircraft speed, etc., pertaining to the respective first flyby and second flyby.

At 230, the LBLR complex CCD image product is segmented into a plurality of superpixels, where location, shape, and size of each superpixel is based upon values of pixels in the LBLR complex CCD image product.

At 240, optionally, based upon one or more criteria (such as statistics relating to values of pixels in superpixels) determined for each superpixel, superpixels having similar criteria values (e.g., similar average coherency) can be clustered. For example, superpixels having an estimated coherency value of less than 0.1 assigned thereto can be quantized as first-order superpixels. Likewise, superpixels having an estimated coherency value of 0.1-0.2 can be quantized as second-order superpixels. The quantization process can be repeated until all superpixels have been quantized, resulting in a fixed number of quantized coherence regions in the complex CCD image product.

At 250, for each quantized region (and thus for each pixel in the quantized region), an appropriately sized box-filter can be determined. For example, as noted above, regions having a low level of coherency can be assigned a large box-filter (e.g., a 25×25 box-filter). In another example, the regions identified as having a high level of coherency can be assigned a small box-filter (e.g., a 5×5 box-filter).

At 260, a RBMR CCD image product is formed based upon the box-filters assigned to the quantized regions of the low bias, low resolution CCD image product. Thus, for each pixel in the RBMR CCD image product, a value for the pixel is computed based upon the box-filter size assigned to the region that corresponds to the pixel. Hence, the RBMR CCD image product can comprise high coherency regions which have relatively high resolution (e.g., exhibit a high level of detail), and the RMBR CCD image product can also comprise low coherency regions computed with less resolution (but also having reduced bias).

While the foregoing presents various concepts regarding addressing bias-related issues in CCD imagery, the following (e.g., FIGS. 3-13 and pertinent text) extend the concepts. The various algorithms, etc., presented in the following can be utilized by the image processor component 160 to perform any of forming a complex CCD image, superpixel formation, bias determination and removal, etc.

As previously mentioned, CCD image products can provide information about subtle scene changes between two SAR image acquisition times. CCD image products are formed from a pair of complex-valued SAR images (e.g., SAR images 170 and 172) by first, performing a fine, sub-pixel registration of the two SAR images, and second, computing the sample correlation statistic in local spatial regions through use of the following:

$$\hat{\delta} = \frac{\langle I_1 I_2^* \rangle_N}{\langle |I_1|^2 \rangle_N^{1/2} \langle |I_2|^2 \rangle_N^{1/2}}, \quad (1)$$

where $I_1$ and $I_2$ denote the two registered SAR images 170 and 172, the superscript * denotes complex-conjugation, and $\langle \bullet \rangle_N$ denotes an N×N spatial average (e.g., the box-filter). The CCD image product 175 is formed from taking the magnitude of the estimated correlation coefficient, per Eqn. 2:

$$\hat{\gamma} = |\hat{\delta}| = \frac{|\langle I_1 I_2^* \rangle_N|}{\langle |I_1|^2 \rangle_N^{1/2} \langle |I_2|^2 \rangle_N^{1/2}}, \quad (2)$$

and illustrates the variations in coherence between the two SAR image products 170 and 172. Low coherence regions in the CCD image product 175 illustrate changes that have occurred between the two image acquisition times (e.g., acquisition times of data sets 140 and 142).

A sample coherence statistic is a biased estimator for low coherence regions. Furthermore, as previously mentioned, increasing the coherence-estimator filter width utilized to compute the sample coherence decreases the bias in the low coherence regions, but also lowers the resolution of the CCD image product 175. Hence, there is a tradeoff between allowable bias in low-coherence regions and the resolution of the entire CCD image product 175.

For a gray-scale CCD image product, the low-coherent regions of the image, such as shadow regions (which should have zero coherence), formed with a small size box-filter may have a noisy "salt-and-pepper"-like appearance. The "salt-and-pepper"-like appearance is actually not noise, but rather a manifestation of bias in the CCD image product 175.

The various embodiments presented herein relate to forming CCD image products that have resolution locally adjusted based on local coherence statistics of a preliminary coarse-resolution (low-bias) CCD image product (e.g., CCD image product 175). The resulting image product is a RBMR CCD image product 179, where low coherence regions have a small-low bias, and high coherence region have a high level of detail exhibited therein.

With regard to bias formation in a CCD image product, with an assumption that statistics of the two SAR images 170 and 172 are complex-Gaussian, then the probability distribution function of the coherence estimate in Eqn. 2 is given, per Eqn. 3:

$$p_{\hat{\gamma}}(\hat{\gamma}|\gamma 0, L) = 2(L-1)(1-\gamma_0^2)^L \hat{\gamma}(1-\hat{\gamma}^2)^{L-2} F(L, L, 1; \hat{\gamma}_0^2 \hat{\gamma}^2), \quad (3)$$

where F is the generalized hypergeometric function, L is the number of independent samples in the spatial average, and $\gamma_0$ is the true coherence value. Eqn. 3 can be interpreted such that it gives a probability distribution of a coherence estimate taking on a true coherence value for a given spatial region with L independent looks and true coherence value $\gamma_0$.

Figure 3:
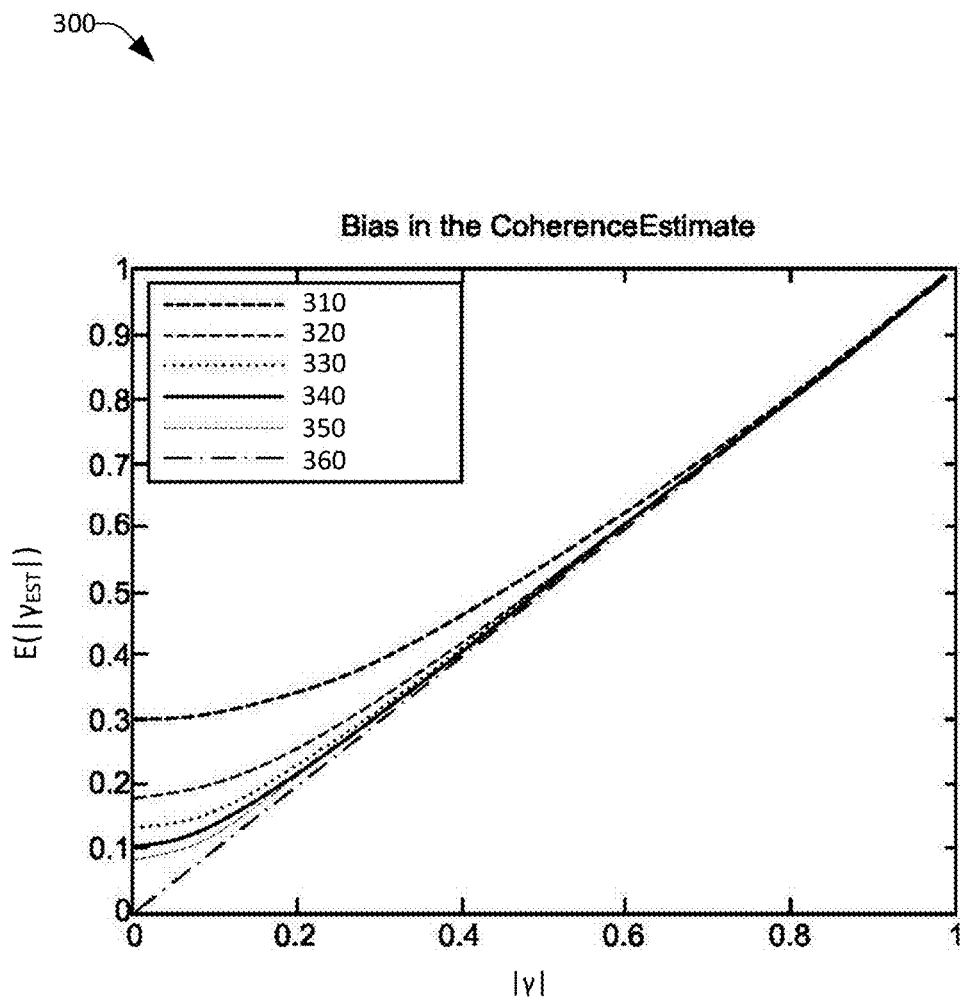
FIG. 3 presents an exemplary chart illustrating bias for different numbers of independent samples per a sample coherence function.

The coherence estimator in Eqn. 2 is a biased estimator, that is $(\hat{\gamma}) \neq \gamma$, where E( ) is the expected value operator. The analytic expression for the bias in CCD images is given per Eqn. 4:

$$E(\hat{\gamma}) = \frac{1}{2} B\left(L, \frac{1}{2}\right) F\left(\frac{3}{2}, L, L; L + \frac{1}{2}, 1; \gamma^2\right)(1 - \gamma^2)^L, \quad (4)$$

where B is the beta function. FIG. 3, chart 300 depicts plots generated from the function presented in Eqn. 4 for several values of L. Line 310 is for L=9, line 320 is for L=25, line 330 is for L=49, line 340 is for L=81, and line 350 is for L=121. Line 360 is for an unbiased condition.

Eqn. 4 can be difficult to evaluate for large values of L. Thus, for large values of L (e.g., L>121), the following hyperbolic function can be utilized as a surrogate function:

$$E(\hat{\gamma}) \approx f(\gamma) = \sqrt{\left(\frac{1}{2} B\left(L, \frac{1}{2}\right)\right)^2 + \left(1 - \left(\frac{1}{2} B\left(L, \frac{1}{2}\right)\right)^2\right) \gamma^2}, \quad L > 121. \quad (5)$$

The hyperbolic function of Eqn. 5 serves well as a surrogate function for large values of L, but is a poor substitute for small values of L. Thus, Eqn. 4 can be utilized for L<121 and the surrogate hyperbolic functions of Eqn. 5 for L≥121.

Figure 4:
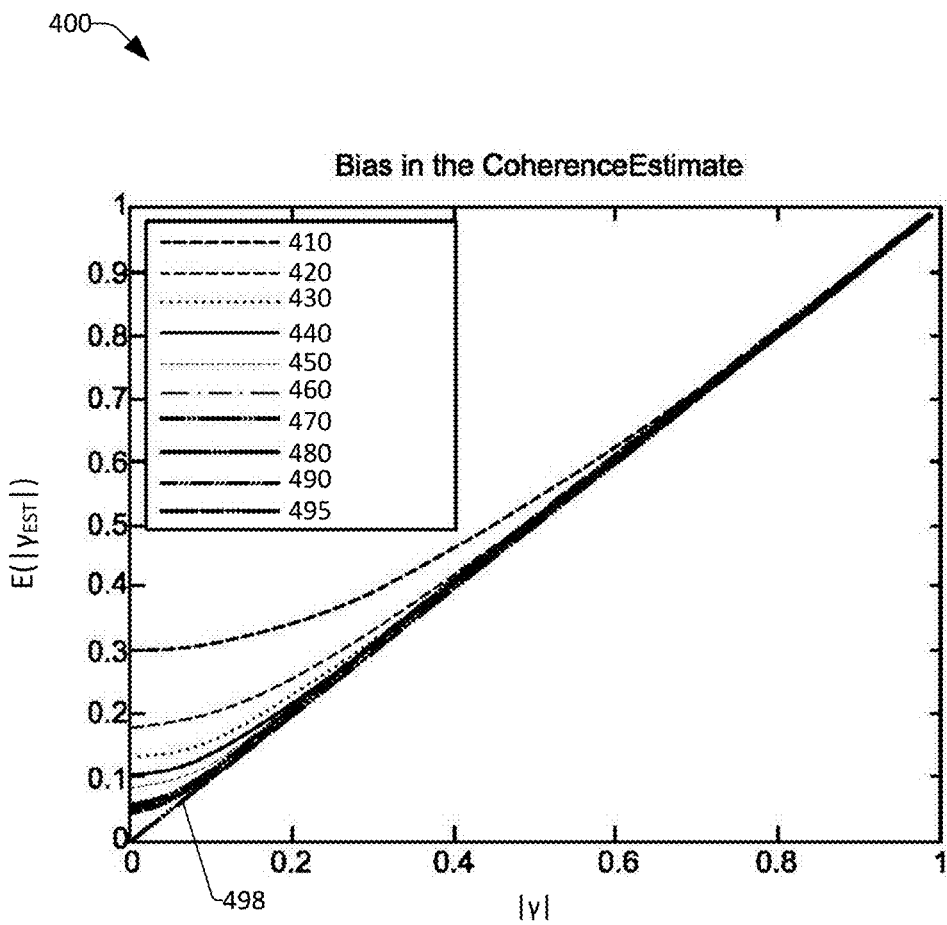
FIG. 4 presents an exemplary chart illustrating a relation between a bias function and a hyperbolic surrogate function for various values of L.

FIG. 4 presents a chart 400 which depicts the bias function and the hyperbolic surrogate function for various values of L. Plots 410-450 are generated from Eqn. 4 for L<121 and further, the hyperbolic surrogate functions for L>121 from Eqn. 5 are used for plots 460-495. Line 410 is for L=9, line 420 is for L=25, line 430 is for L=49, line 440 is for L=81, line 450 is for L=121, line 460 is for L=169, line 470 is for L=225, line 480 is for L=289, line 490 is for L=361, and line 495 is for L=441. Line 498 is for an unbiased condition.

Figure 5:
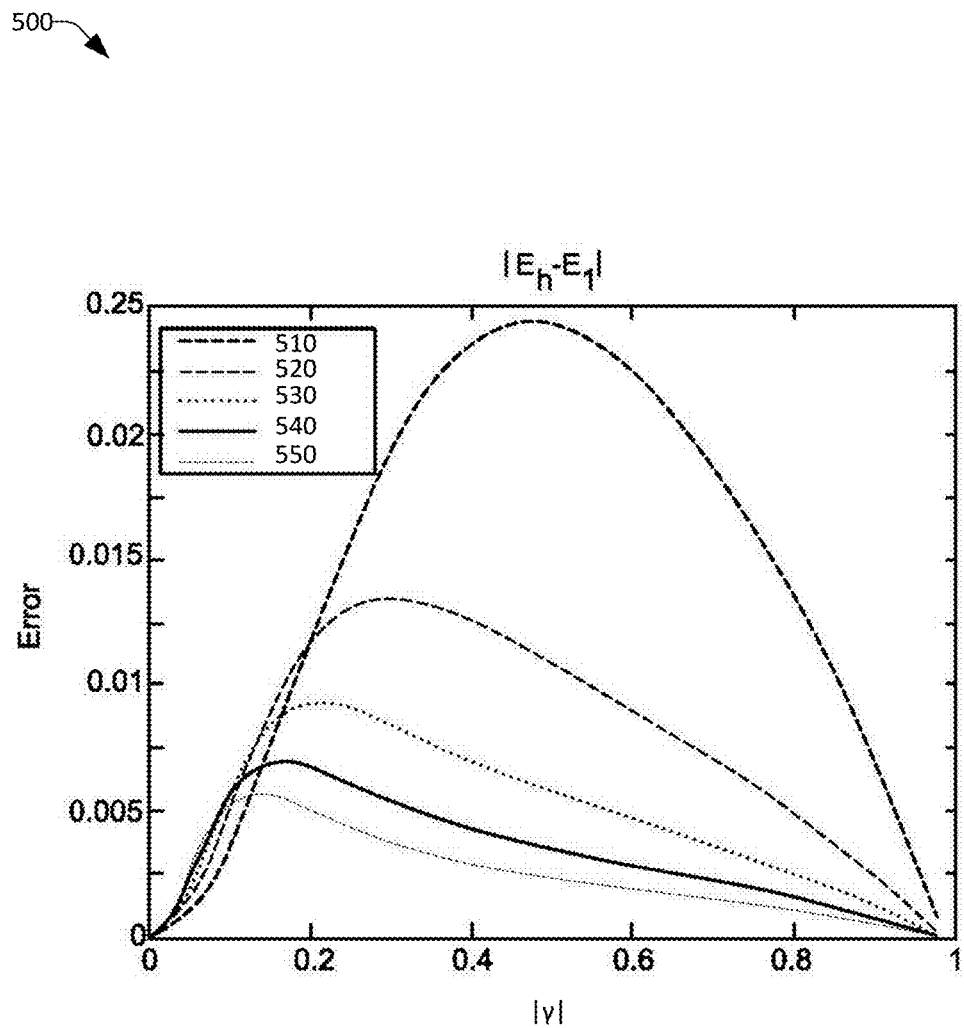
FIG. 5 presents an exemplary chart illustrating error between a bias function and a hyperbolic surrogate function.

FIG. 5, plot 500 presents absolute error between the bias function of Eqn. 4 and the proposed surrogate function of Eqn. 5 for various (e.g., small) values of L. Line 510 is for L=9, line 520 is for L=25, line 530 is for L=49, line 540 is for L=81, and line 550 is for L=121. It is to be noted from FIG. 5, that as L increases that the absolute error tends toward zero.

From the curves in FIGS. 3 and 4, it is apparent that bias is not problematic in high-coherence regions; however, the bias becomes increasingly problematic for low-coherence regions. The bias in CCD image products is most apparent in the low-coherence regions and is manifested as a "salt-and-pepper"-like mixture of low- and high-coherence in regions such as water, shadow, and other areas that should not have coherence.

With regard to a number of independent samples, in order to properly quantify the bias in CCD image products using Eqns. 3 and 4, it is desired to quantify the effective number of independent samples contained within a selected size of box-filter. In general, for a box-filter of size M×N, $L_{eff} \leq N^2$, where $L_{eff}$ is the effective number of independent samples.

Two factors that can determine the effective number of independent samples for a given box-filter size, are: (a) the effective number of samples can depend on an impulse response (IPR) oversampling factor, which is denoted as $k_0$; and (b) the type of window that is used for side-lobe level control.

It is to be noted that if $k_0=1$ and a rectangular window is used in forming a SAR image product, then $L_{eff}=L=N^2$. The effective number of looks in a spatial average used to compute CCD image products (from SAR imagery) that have been windowed and oversampled can be computed in a number of different ways. One method involves simulating the statistics for an image product formed with a given oversample factor, window function, and $\gamma_0$, forming the pseudo-probability distribution from the histogram, and then determining the value of L that makes probability density in Eqn. 3 best fit the histogram (per FIG. 7). Another approach is to find a large area in a CCD image product that should have no coherence, such as water or a shadow region, form the CCD image product of the selected low-coherence region with a pre-determined box-filter size, compute the average coherence for the region, then compare the computed average coherence with the y-intercept values of the bias curves generated by Eqn. 4. To be explicit, per Eqn. 6:

$$L_{eff} = \min_L \left| \frac{1}{2} B\left(L, \frac{1}{2}\right) - \hat{\gamma}_{avg} \right|, \quad (6)$$

where the beta function characterizes the y-intercept locations of the bias curves. This latter approach is what has been utilized herein to determine the effective number of looks per the various presented embodiments.

Figure 6:
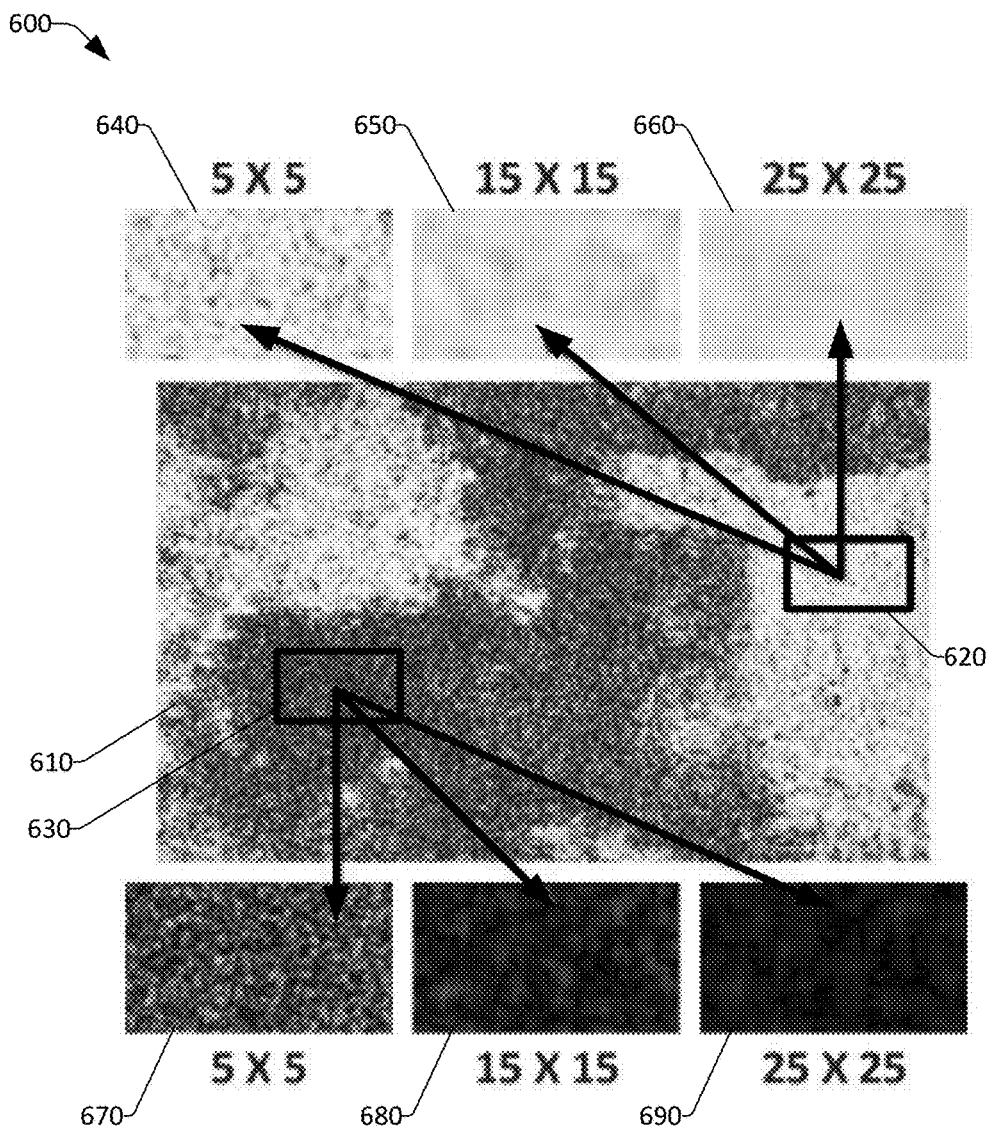
FIG. 6 presents a plurality of exemplary image chips formed for low coherence and high coherence regions of a CCD image product.

FIG. 6 presents a plurality of exemplary image chips 600 formed for low-coherence and high coherence regions of a CCD image product. As an example, a partial CCD image product 610 is depicted in FIG. 6. The SAR images used to create the CCD image product 610 were formed with a Taylor window with −35 dB sidelobe levels and n=4, and have an oversample factor of $k_0=1.5$ in both range and azimuth. The CCD image product 610 was formed with a 5×5 box-filter; however, due to the oversampling and the window function, the computed effective number of independent samples is $L_{eff} \approx 9$. A high-coherence region 620 and a low-coherence region 630 were selected from the CCD image product 610 and were re-formed by using a 5×5 box-filter, a 15×15 box-filter, and a 25×25 box-filter, with effective number of independent samples, $L_{eff} \approx 9$, 62, 137, respectively. Chip 640 is for a 5×5 box-filter of the high-coherence region 620, chip 650 is for a 15×15 box-filter of the high-coherence region 620, and chip 660 is for a 25×25 box-filter of the high-coherence region 620. Chip 670 is for a 5×5 box-filter of the low-coherence region 630, chip 680 is for a 15×15 box-filter of the low-coherence region 630, and chip 690 is for a 25×25 box-filter of the low-coherence region 630.

Figure 7:
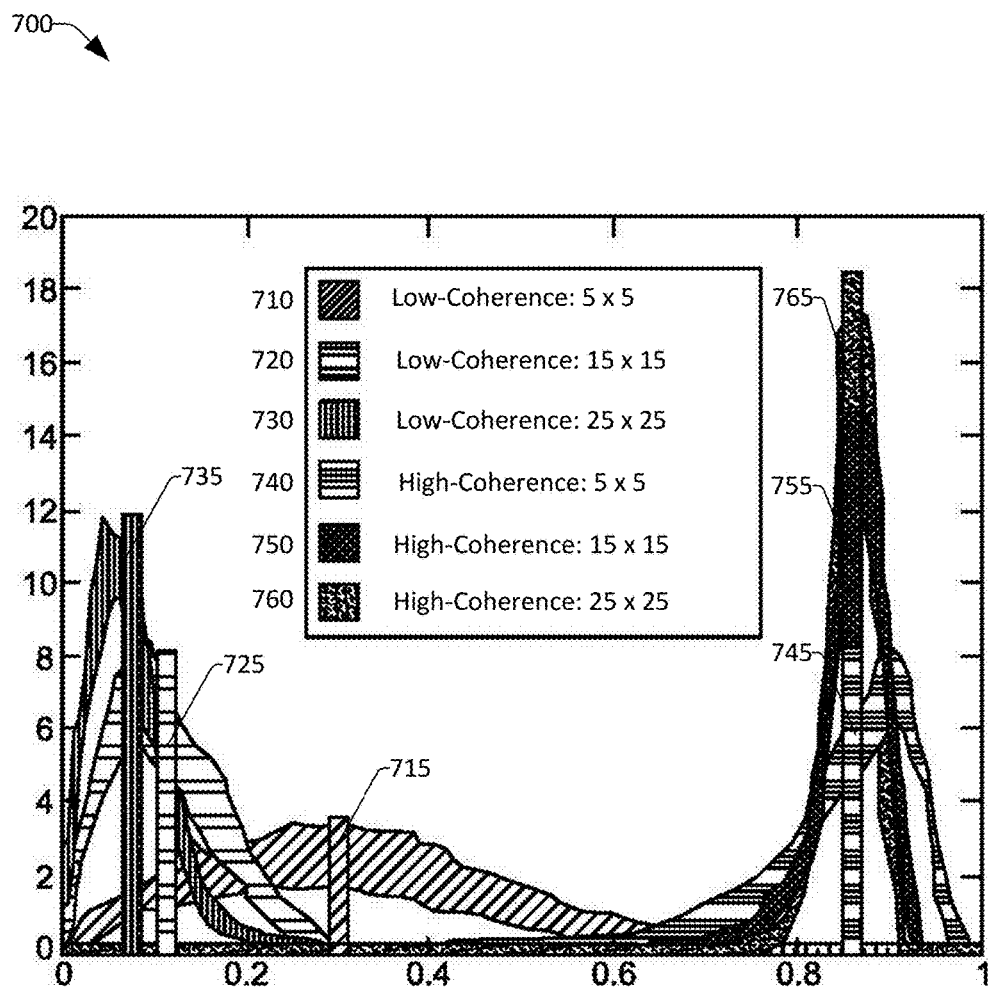
FIG. 7 presents an exemplary chart of histograms of image chips formed from low coherence and high coherence regions of a CCD image product.

FIG. 7, plot 700, presents normalized histograms for low-coherence chips (e.g., chips 670, 680, and 690) and high-coherence chips (e.g., chips 640, 650, and 660) respectively formed from each box-filter size presented in FIG. 6. Plot 710 is a histogram of values for chip 670 (having a mean value 715), plot 720 is a histogram of chip 680 (having a mean value of 725), and plot 730 is a histogram of chip 690 (having a mean value of 735). Plot 740 is a histogram of values for chip 640 (having a mean value of 745), plot 750 is a histogram of chip 650 (having a mean value of 755), and plot 760 is a histogram of chip 660 (having a mean value of 765). It is to be noted that the mean values 715, 725, and 735 of the pseudo-densities of the low-coherence chips 710, 720, and 730 migrate toward zero-coherence as the box-filter size is increased. This instability of the mean, with respect to the size of the box-filter, is a manifestation of the bias in the low-coherence estimate. To also be noted is the effect of different size box-filters on the high-coherence chips 640, 650, and 660, wherein the mean values 745, 755, and 765 hardly deviate regardless of the size of the box-filter (e.g., effective number of independent samples), which indicates that high-coherent regions have minimal bias.

Considering bias versus resolution, as mentioned previously, the bias can always be driven down to very low levels by using a larger box-filter; however, the resolution of the resulting CCD image product suffers as a result. From the bias curves illustrated in FIG. 3, it is apparent that the maximum bias occurs when the true bias should be zero (the y-intercept of the graph 300). The value of the maximum bias as a function of the number of independent looks is given by the bias equation evaluated at $\gamma=0$, per Eqn. 7:

$$E(\hat{\gamma})|_{\gamma=0} = \frac{1}{2}B\left(L, \frac{1}{2}\right). \quad (7)$$

Essentially, selecting the CCD resolution determines the maximum amount of bias in the CCD image product 175. Or, it can also work the other way around, selecting the maximum allowable bias also determines the resolution of the CCD image product 175. For independent samples, the resolution of a CCD image product formed with an N×N box-filter is approximately related to the SAR resolution by $\rho'=N\rho$, and N is related to L by $N=\sqrt{L}$. Combining, per Eqn. 8, gives:

$$L = \left(\frac{\rho'}{\rho}\right)^2. \quad (8)$$

Thus, the bias equation evaluated for $\gamma=0$ can also be stated, per Eqn. 9, as:

$$E(\hat{\gamma})|_{\gamma=0} = \frac{1}{2}B\left(\left(\frac{\rho'}{\rho}\right)^2, \frac{1}{2}\right) \quad (9)$$

Figure 8:
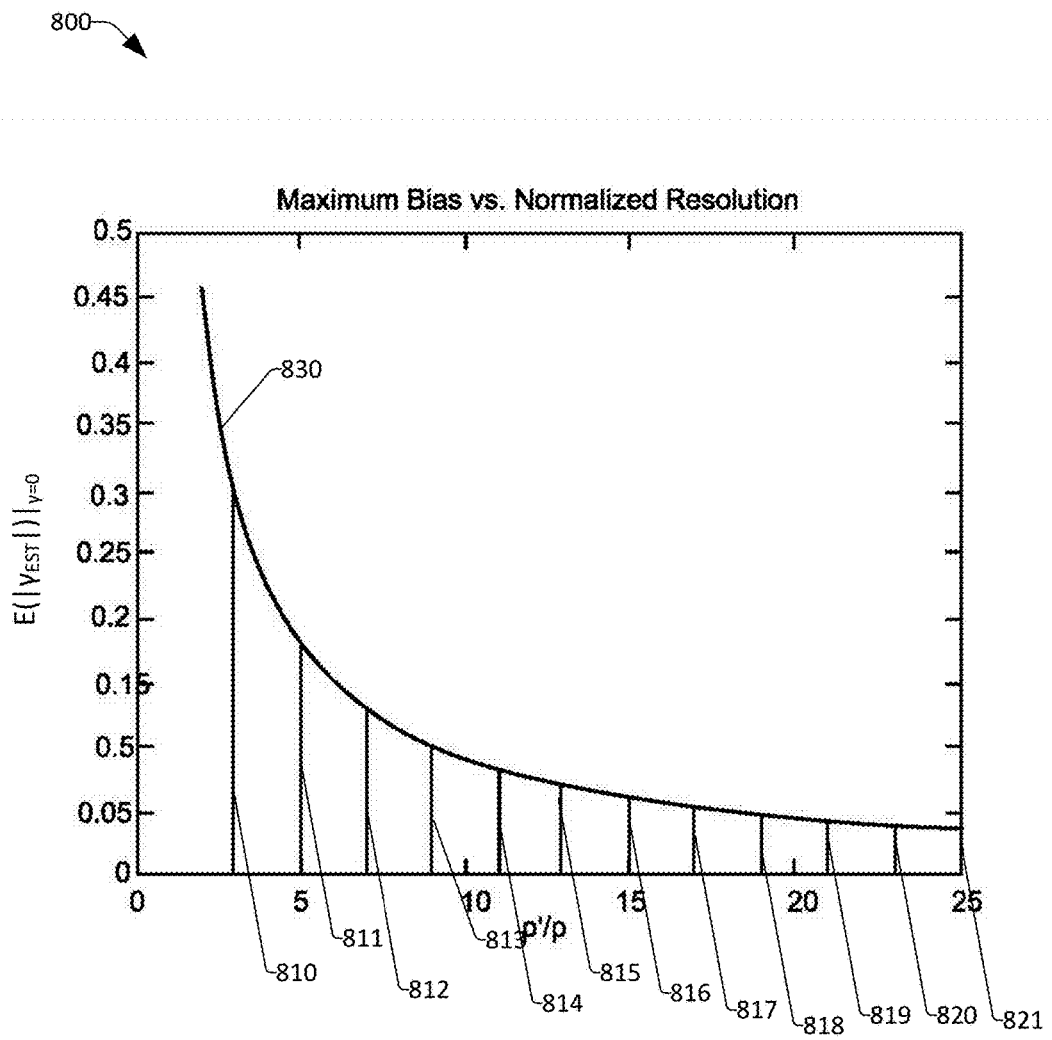
FIG. 8 presents an exemplary chart illustrating a maximal amount of bias in a CCD image product versus a normalized resolution.

FIG. 8, plot 800, illustrates a maximal amount of bias in a CCD image product as a function of a normalized resolution of the CCD image product. The discrete values, denoted by the vertical lines 810-821 in the FIG. 8, represent the bias from independent samples and the curve 830 represents arbitrary levels of bias due to the effective number of independent samples.

The various embodiments presented herein can be directed towards two methods for bias reduction, the first is an analytical approach and the second is statistical-based.

Figure 9:
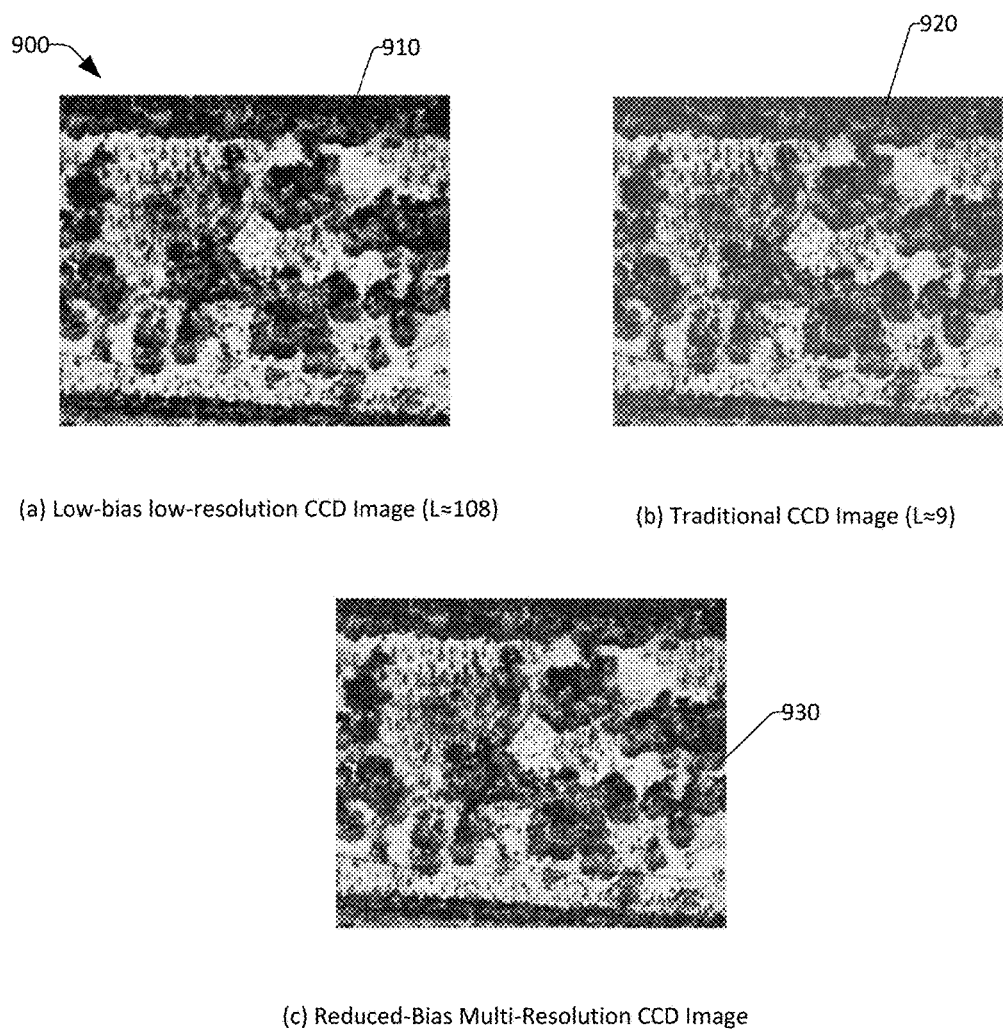
FIG. 9 presents three exemplary CCD image products.

As shown in FIG. 9, three CCD image products 900 are presented, image product 910 is a low-bias low-resolution CCD image product (where $L \approx 108$), image product 920 is a traditional CCD image product (where $L \approx 9$), and image product 930 is an RBMR CCD image product formed by setting a maximum allowable bias to 0.1285.

In both the analytical approach and the statistical approach, a low-resolution low-bias CCD image product 910 is formed, and a RBMR CCD image product 930 is formed. However, the results may not be the same, as will be discussed further.

One analytic method for creating a RBMR CCD image product 930 involves selecting a maximum allowable amount of bias, denoted as $\zeta$, which can be used to parameterize a bias line. The graph of the bias line crosses the y-axis at $\zeta$ and must pass through the point (1, 1), wherein, per Eqn. 10:

$$f(\gamma)=(1-\zeta)\gamma+\zeta. \quad (10)$$

This bias line will intersect the family of bias curves generated from different values of L and create intervals along the x-axis of the graph which define the box-filter sizes to be used to construct the RBMR CCD image product 930. The box-filter size, for a particular interval, is chosen by selecting the value of L associated with the largest bias curve directly under the bias line.

Figure 10:
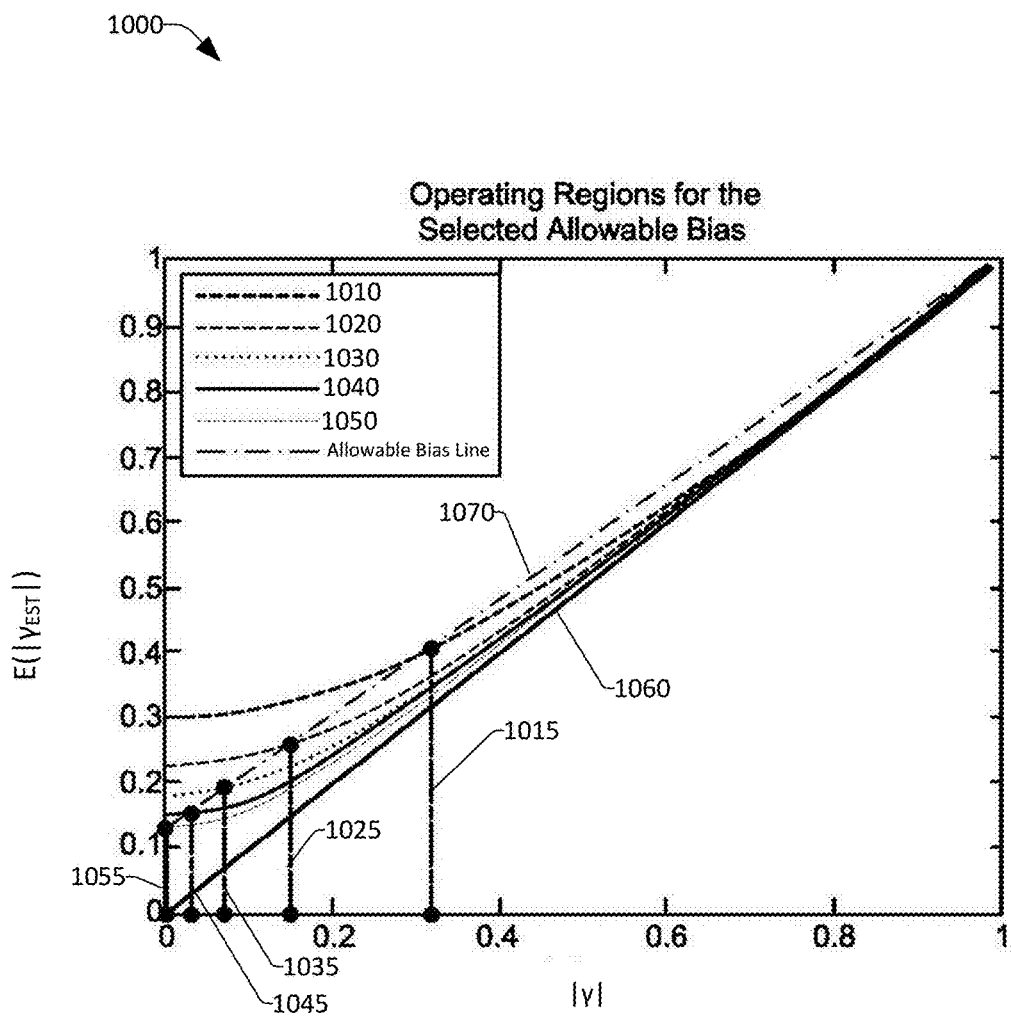
FIG. 10 presents an exemplary chart illustrating the operating regions for different filters for computing a RBMR CCD image product for a given maximum allowable amount of bias.

As an example, a set of bias curves are presented in FIG. 10, plot 1000. Bias curve 1010 is for L=9, bias curve 1020 is for L=16, bias curve 1030 is for L=24, bias curve 1040 is for L=35, and bias curve 1050 is for L=48. Line 1060 is the unbiased line, and line 1070 is an allowable bias line. The allowable bias line 1070 intersects the respective bias curves 1010-1050 as indicated by the locations of the black dots of respective lines 1015, 1025, 1035, 1045, and 1055. The maximum allowable bias is identified on the y-axis, thereby defining the allowable bias line 1070 which intersects at (1, 1) at the other end. The intervals between the intersections of the allowable bias line 1070 with the bias curves 1010-1050 define the intervals on the x-axis for selecting the size of the box-filters to use for that given coherence interval.

As previously mentioned, for instances where L<121, the intersection values can be computed numerically from Eqn. 4, while for instances where L>121 the intersection values can be computed analytically or numerically from Eqn. 5, where such computations can be performed by the image processor component 160. The dashed black lines (respectively 1015, 1025, 1035, 1045, and 1055) that extend from the points of intersection of the allowable bias line 1070 with respective curves 1010, 1020, 1030, 1040, and 1050 to the x-axis mark the coherence intervals for picking the box-filter sizes. For example, for the interval $|\gamma| \in [0.32, 1]$; note that the bias curve just under the allowable bias line 1070 is the curve 1010, wherein curve 1010 is associated with the box-filter that has nine independent looks (e.g., L=9). Therefore, the regions of the low-resolution CCD image product 910 that have coherence within the interval stated above can be re-formed with a box-filter that has nine independent looks. Such a re-formation can be achieved in a number of ways.

One method is to create a binary mask from the low-resolution CCD image product and place a "1" where the coherence falls within the specified coherence region and a "0" elsewhere. Then, a CCD image product is computed with the specified box-filter size, the mask is applied, and only the desired regions are extracted. This process can be repeated for each of the remaining coherence intervals illustrated in FIG. 10.

Referring back to FIG. 9, as mentioned, CCD image product 920 is formed from a traditional method of forming CCD image products. The RBMR CCD image product 930 is formed with the equivalent of about nine independent looks, where the maximal acceptable bias is set to =0.1285; it is to be noted that there are five filter intervals for this bias setting. The RBMR CCD image product 930 formation process has considerably decreased amount of bias compared to the traditional CCD image product 920, while maintaining high resolution in the high-coherence regions.

Figure 11:
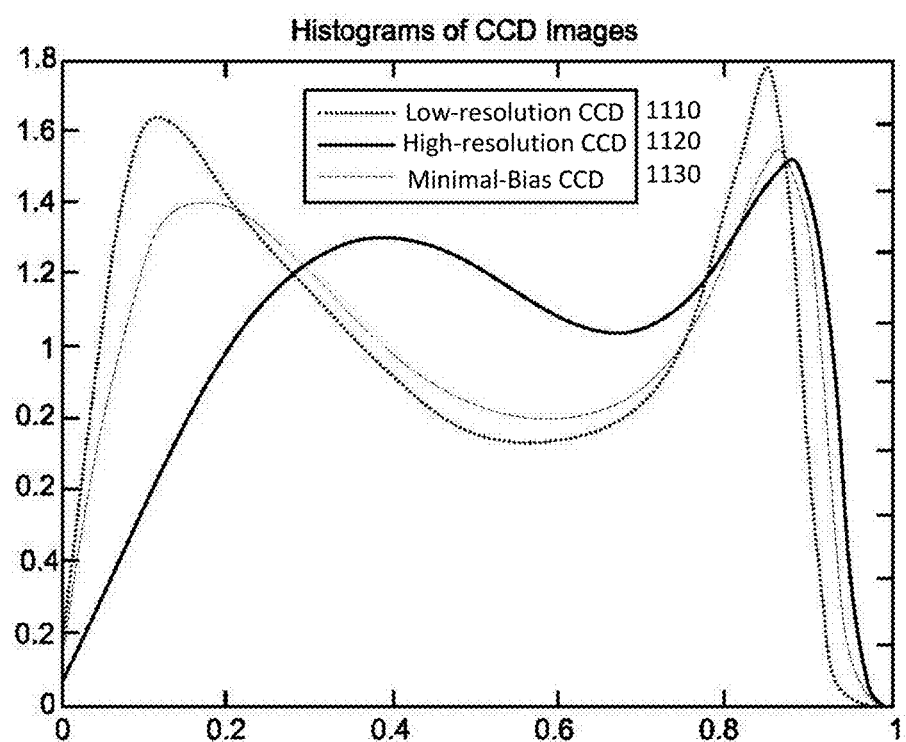
FIG. 11 presents an exemplary chart presenting normalized histograms for a low resolution CCD image product, a high resolution CCD image product, and an exemplary RBMR CCD image product.

FIG. 11 presents a chart 1100 illustrating normalized histograms for the low-resolution CCD image product 910, the high-resolution traditional CCD image product 920, and the RBMR CCD image product 930. Plot 1110 is for the image product 910, plot 1120 is for the image product 920, and plot 1130 is for the image product 930. It is to be noted that the mode in the low coherence region of the RBMR CCD image product 930 has moved significantly toward the mode in the low-coherence region of the low-resolution CCD image product 910, indicating that a significant amount of bias has been removed in the RMBR CCD image product 930.

Figure 12:
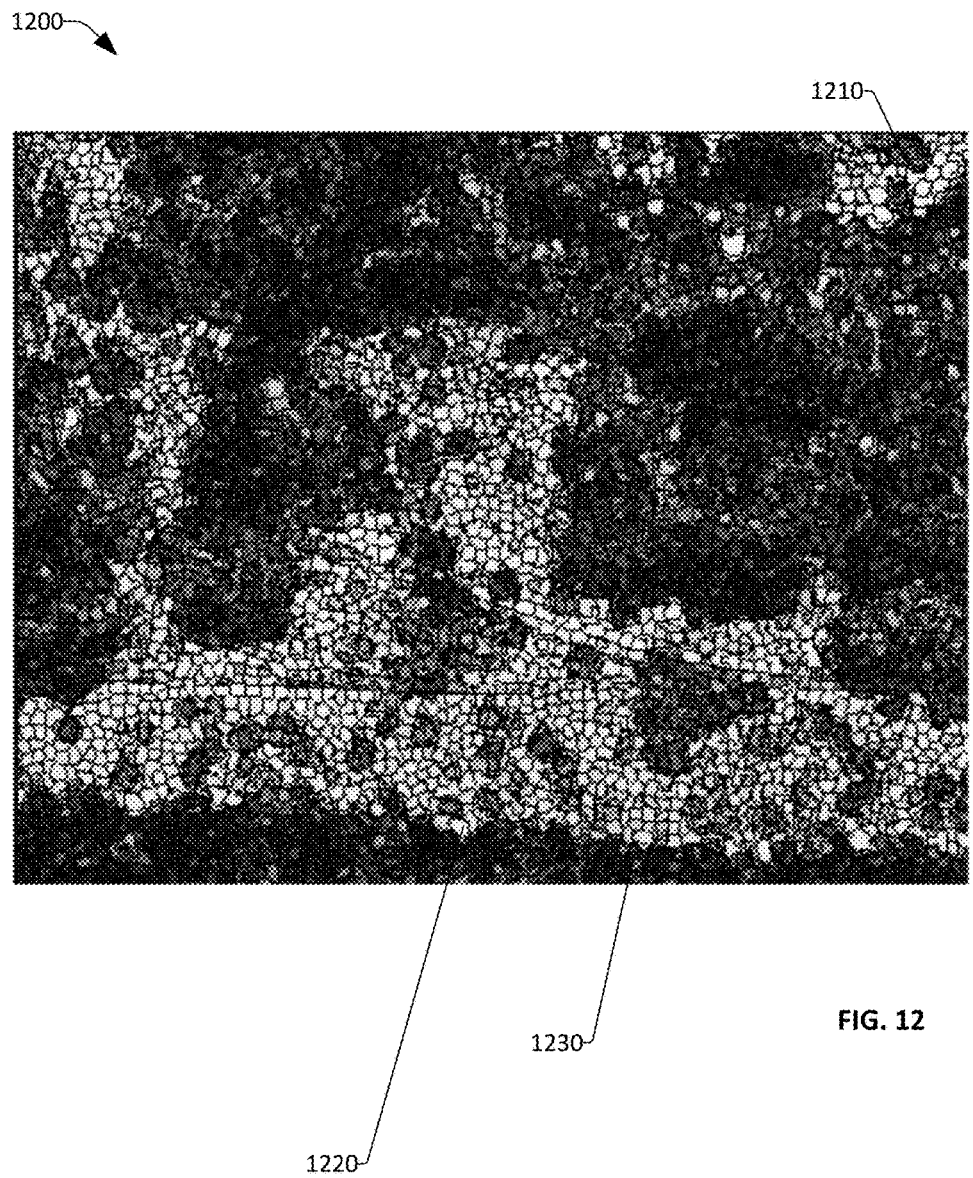
FIG. 12 presents a low resolution CCD image product having undergone superpixel segmentation.

Statistical-based methods for bias reduction can involve segmenting the initial low-resolution, low-bias CCD image product 910 (as described with respect to FIG. 1). As previously mentioned, the CCD image product 910 can be segmented using a superpixel segmentation algorithm (e.g., a SLIC algorithm). The algorithm can segment a CCD image product into a number of small "like" regions, referred to as superpixels, wherein the regions can be configured in accordance with a user-defined value. An example of the superpixel segmentation of a low-resolution CCD image product 910 is illustrated in FIG. 12, image 1200. As shown in image 1200, a number of superpixels 1210 are illustrated, wherein a superpixel 1220 is a region of image 1200 having a high coherence, and a superpixel 1230 is a region of image 1200 having a low coherence.

The low-resolution CCD image product can be segmented to enable utilization of the statistics of the superpixels (e.g., superpixels 1210, 1220, 1230) to form the RBMR CCD image product 930 by adaptively selecting the box-filter size based on the computed statistics (such as the average coherence within a respective superpixel). From this initial segmentation, there are a number of different possible ways to proceed. For example: (a) compute the average coherence of each superpixel 1210, find the pixels in the complex SAR images associated with each superpixel 1210, use the average coherence of each superpixel 1210 to select a box-filter size for the selected pixels in the complex SAR images and form the output of the RBMR CCD image product superpixel by superpixel; (b) merge superpixels with similar statistics into larger regions, then proceed per (a) using the larger regions; (c) compute the histogram of the statistics of the superpixels 1210, fit a Gaussian mixture model (GMM) to the histogram and solve for the means using the expectation/maximization (EM) algorithm, determine the necessary box-filter sizes required for the final image based on the locations of the means of the GMM, then form the final image (e.g., RBMR CCD image product 179) by applying the different sizes of box-filters to the regions in the complex SAR images corresponding to the regions of the means from the GMM. Such statistics that can be analyzed include superpixel median coherence value, mean coherence values, coefficient of variation, etc.; (d) use a clustering algorithm on the computed statistics of the superpixels to determine the necessary box-filter sizes based on the regions of the clustering, then form the final image by applying the different size box-filters to the regions in the complex SAR images that correspond to the regions of clusters.

The first two methods (a) and (b) are more of brute-force methods, whereas the last two methods (c) and (d) are more adaptive to the data and are capable of reducing the number of box-filter sizes needed in forming the final image.

FIG. 13 illustrates a methodology 1300 relating to creating a RBMR CCD image product. At 1310, a CCD image product can be received, wherein the CCD image product has undergone segmentation into a plurality of superpixels. A superpixel in the plurality of superpixels can correspond to a region of the CCD image product that has low coherence.

At 1340, a criteria can be received, wherein the criteria can be a value relating to coherence, bias, etc. For example, the criteria can be a maximum level of permissible bias in the CCD image product.

At 1330, a criteria can be received, wherein the criteria can be a value relating to coherence, bias, etc. For example, the criteria can be a maximum level of permissible bias in the CCD image product.

At 1350, a size of a box-filter to use when computing values of pixels in the superpixels in a resultant RBMR CCD image product is selected based upon the property of the superpixel and the criteria. The methodology 1300 was presented to illustrate that size of box-filters to use when computing a RBMR CCD image product can be a function of a defined allowable bias in the RBMR CCD image product, with a smaller allowable bias corresponding to use of larger box-filters.

Figure 14:
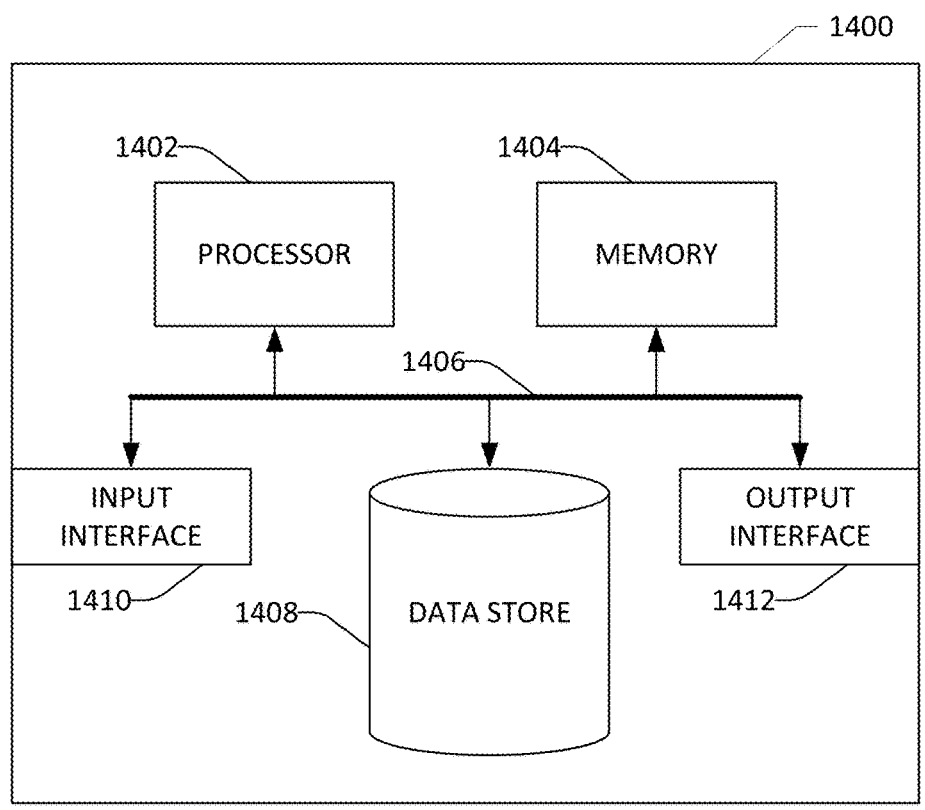
FIG. 14 illustrates an exemplary computing device.

Referring now to FIG. 14, a high-level illustration of an exemplary computing device 1400 that can be used in accordance with the systems and methodologies disclosed herein is illustrated. For example, the computing device 1400 may be utilized to generate a RBMR CCD image product. For example, computing device 1400 can operate as the computing device 145, or a controller (associated with) the radar system 130. The computing device 1400 includes at least one processor 1402 that executes instructions that are stored in a memory 1404. The instructions may be, for instance, instructions for implementing functionality described as being carried out by one or more components discussed above or instructions for implementing one or more of the methods described above. The processor 1402 may access the memory 1404 by way of a system bus 1406. In addition to storing executable instructions, the memory 1404 may also store operating parameters, SAR data, and so forth.

The computing device 1400 additionally includes a data store 1408 that is accessible by the processor 1402 by way of the system bus 1406. The data store 1408 may include executable instructions, operating parameters, SAR data, etc. The computing device 1400 also includes an input interface 1410 that allows external devices to communicate with the computing device 1400. For instance, the input interface 1410 may be used to receive instructions from an external computer device, from a user, etc. The computing device 1400 also includes an output interface 1412 that interfaces the computing device 1400 with one or more external devices. For example, the computing device 1400 may display text, images, etc., by way of the output interface 1412.

Additionally, while illustrated as a single system, it is to be understood that the computing device 1400 may be a distributed system. Thus, for instance, several devices may be in communication by way of a network connection and may collectively perform tasks described as being performed by the computing device 1400.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

What has been described above includes examples of one or more embodiments. It is, of course, not possible to describe every conceivable modification and alteration of the above structures or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A computing device comprising:
a processor; and
memory that comprises instructions that, when executed by the processor, cause the processor to perform acts comprising:
receiving a first synthetic aperture radar (SAR) image and a second SAR image for a scene, the first SAR image registered with the second SAR image, the first SAR image corresponds to a first time, the second SAR image corresponds to a second time;
generating a coherence change detection (CCD) image, wherein generating the CCD image comprises computing a sample correlation of a product of the first SAR image with a complex-conjugate of the second SAR image, wherein each pixel of the CCD image has a value that is computed using a box filter of a first size;
responsive to generating the CCD image, segmenting the CCD image into a plurality of segments, wherein the CCD image is segmented into the plurality of segments based upon the values of the pixels of the CCD image,
identifying a plurality of box filter sizes for the plurality of segments of the CCD image such that each pixel of the CCD image is assigned a respective box filter size, wherein the plurality of box filter sizes are identified based upon the values of the pixels of the CCD image, and
generating, a reduced bias multi-resolution (RBMR) CCD image, wherein generating the RBMR CCD image comprises computing the sample correlation of the product of the first SAR image with the complex-conjugate of the second SAR image, wherein each pixel of the RBMR CCD image has a value that is computed using the respective box titter size assigned to the pixel.

2. The computing device of claim 1, wherein identifying a plurality of box filter sizes for the plurality of segments of the CCD image comprises:
for a first segment in the plurality of segments:
computing a property for the first segment; and
determining a first box filter size for the first segment based upon the property for the first segment, wherein each pixel in the first segment is assigned the first box filter size;
for a second segment in the plurality of segments:
computing a second property for the second segment; and
determining a second box filter size for the second segment based upon the property for the second segment, wherein each pixel in the second segment is assigned the second box filter size.

3. The computing device of claim 2, the property for the first segment and the property for the second segment being estimated coherence for the first segment and the second segment in the CCD image.

4. The computing device of claim 1, wherein bias of the RBMR CCD image is beneath a predefined threshold amount of bias.

5. The computing device of claim 1, wherein the box filter of the first size is a 25×25 box filter.

6. A method executed by a processor of a computing device, the method comprising:
receiving a first synthetic aperture radar (SAR) image and a second SAR image for a scene, the first SAR image registered with the second SAR image, the first SAR image corresponds to a first time, the second SAR image corresponds to a second time;

generating a coherence change detection (CCD) image, wherein generating the CCD image comprises computing a sample correlation of a product of the first SAR image with a complex-conjugate of the second SAR image, wherein each pixel of the CCD image has a value that is computed using a box filter of a first size;

responsive to generating the CCD image, segmenting the CCD image into a plurality of segments, wherein the CCD image is segmented into the plurality of segments based upon the values of the pixels of the CCD image;

identifying a plurality of box filter sizes for the plurality of segments of the CCD image such that each pixel of the CCD image is assigned a respective box filter size, wherein the plurality of box filter sizes are identified based upon the values of the pixels of the CCD image; and generating a reduced bias multi-resolution (RBMR) CCD image, wherein generating the RBMR CCD image comprises computing the sample correlation of the product of the first SAR image with the complex-conjugate of the second SAR image, wherein each pixel of the RBMR CCD image has a value that is computed using the respective box filter size assigned to the pixel.

7. The method of claim 6, wherein identifying a plurality of box filter sizes for the plurality of segments of the CCD image comprises:

for a first segment in the plurality of segments:
   computing a property for the first segment; and
   determining a first box filter size for the first segment based upon the property for the first segment, wherein each pixel in the first segment is assigned the first box filter size;

for a second segment in the plurality of segments:
   computing a second property for the second segment; and
   determining a second box filter size for the second segment based upon the property for the second segment, wherein each pixel in the second segment is assigned the second box filter size.

8. The method of claim 7, the property for the first segment and the property for the second segment being estimated coherence for the first segment and the second segment in the CCD image.

9. The method of claim 6, wherein bias of the RBMR CCD image is beneath a predefined threshold amount of bias.

10. The method of claim 6, wherein the box filter of the first size is a 25×25 box filter.

* * * * *